June 4, 1946.　　　J. R. HILTNER ET AL　　　2,401,642
EXTRUSION OF THERMOPLASTIC MATERIAL
Filed Oct. 23, 1942
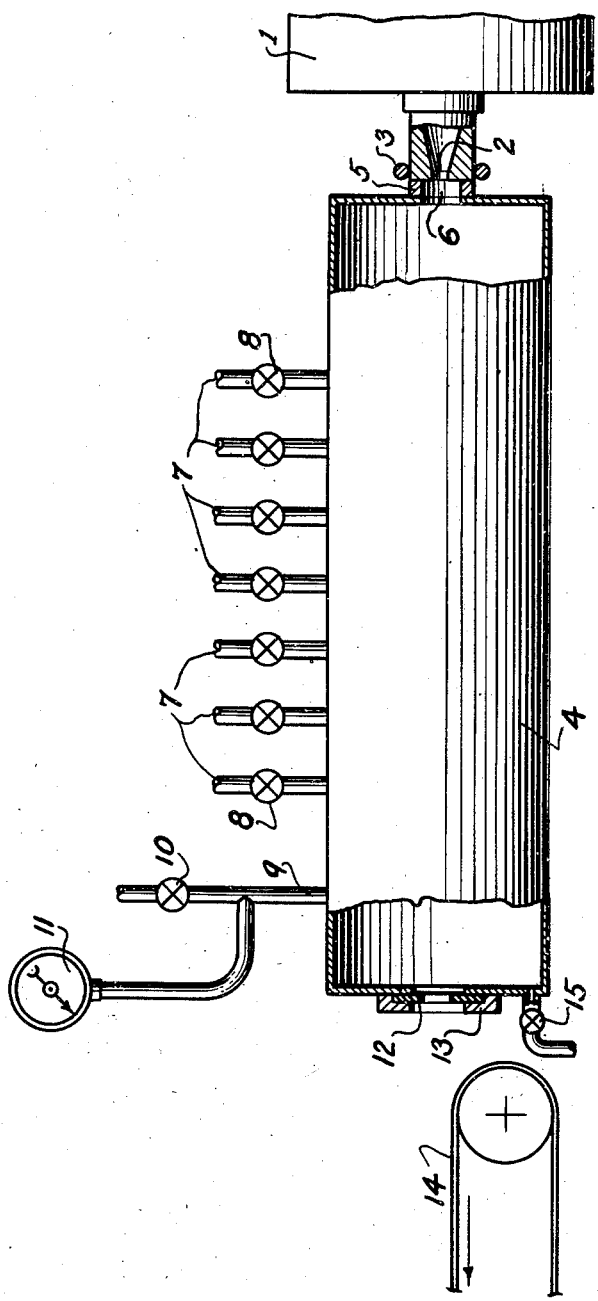
INVENTORS
JAMES R. HILTNER
WILLIAM BERLINGHOF, JR.
BY
THEIR ATTORNEY

UNITED STATES PATENT OFFICE 2,401,642

EXTRUSION OF THERMOPLASTIC MATERIAL

James R. Hiltner, Morrisville, and William Berlinghof, Jr., Bristol, Pa., assignors to Röhm & Haas Company, Philadelphia, Pa., a corporation of Delaware Application October 23, 1942, Serial No. 463,028

7 Claims. (Cl. 18—47.5)

This invention relates to a method for the production of bubble-free shapes of extrudable synthetic organic thermoplastic material. More particularly, it relates to a method for the production of bubble-free shapes consisting essentially of polymethyl methacrylate.

The term "shapes," as used herein, includes rods, tubes, bars, sheets, and other shapes which are prepared by extrusion.

Thermoplastic materials, ordinarily in the form of molding powders, are, in general, capable of being extruded by being forced under heat and pressure through an extrusion die. After the heated material comes through the die, it may be cooled, as for example, by air or by water, and then carried off on a conveyor belt to a winding or cutting mechanism.

After synthetic organic thermoplastic material is extruded through a die, bubbles tend to form while the extruded shape is cooling. In many cases, these "bubbles" are actually voids, and the term "bubbles," as used herein, includes voids. Attempts to prevent bubble formation by slow cooling have not been satisfactory, particularly in the case of sections over about one-quarter inch thick, where excessive cooling time is required.

Our invention makes possible the production of bubble-free shapes and comprises extruding synthetic organic thermoplastic material under heat and pressure through an orifice into a chamber containing a fluid, preferably air, under super-atmospheric pressure, and allowing the extruded shape to cool in said chamber below the temperature at which bubbles ordinarily form.

We have found it desirable to provide means for controlling the cooling of the extruded shape, as, for example, by spraying it with water while it is in the pressure chamber. The extruded shape may be continuously removed from the chamber by passing it through a stuffing box onto a conveyor belt leading to a winding or cutting mechanism. During its passage through the pressure chamber the extruded shape may be supported by a moving belt, or it may be at least partially supported by a quantity of coolant, such as the water hereinbefore referred to that has collected in the bottom of the chamber.

In carrying out our invention, we have found that a pressure of from about 20 pounds to about 50 pounds per square inch in the pressure chamber is sufficiently high to prevent bubble formation. The pressure required will largely depend upon the thickness of the shape being extruded, the higher pressures being required for thicker sections. The speed at which the thermoplastic material may be extruded into the pressure chamber without danger of bubble formation varies according to the thickness of the extruded shape, the lower speeds being required for thicker sections. For example, bubble-free rods one-quarter inch in diameter may be prepared by extruding material consisting essentially of polymethyl methacrylate at a rate of about 25 inches per minute into a chamber containing a fluid under a pressure of about 20 pounds per square inch, whereas, in the case of rods one-half inch in diameter, the speed should not exceed about 15 inches per minute, and the fluid should be under a pressure of about 30 pounds per square inch.

The pressure chamber may be of any convenient shape and, of necessity, must have a diameter greater than the extruded shape. The length of the chamber may be varied in proportion to the speed of extrusion, the most important consideration being that it should be long enough so that the extruded shape will have time to cool below the temperature at which bubbles may be expected to form before it leaves the pressure chamber.

It is desirable to avoid a sudden chilling of the extruded shape because that may cause the formation of voids. To prevent this from happening, it is often desirable, where a fluid is used as a coolant, to preheat the fluid slightly before introducing it into the pressure chamber.

The accompanying drawing is a side elevation through a preferred form of apparatus for the production of bubble-free shapes of extrudable synthetic organic thermoplastic material.

For a more particular description of this preferred form of apparatus, reference is made to the drawing.

To the die end of an extrusion machine 1 of conventional design, as, for example, of the worm-feed type, is attached a die 2 to which heating coils 3 are attached. The die 2 is fastened by suitable means to pressure chamber 4 through ring 5 surrounding the opening 6. Pipes 7, controlled by valves 8, lead from a reservoir not shown and provide means for introducing a coolant into pressure chamber 4. To fluid pressure inlet 9, controlled by valve 10, is attached pressure gauge 11. Rubber outlet 12 is adjustable by means of a gland 13 which tightens against rubber outlet 12. A conveyor belt 14 of conventional design is in close proximity to rubber outlet 12. Coolant outlet 15 provides means for removing any excess coolant that collects in pressure chamber 4.

In the production of bubble-free rods, tubes, bars, sheets, etc., of thermoplastic material with the apparatus described herein, the thermoplastic material is forced under heat and pressure through the die 2 into pressure chamber 4 containing a fluid such as, for example, air which has been admitted under pressure through pressure inlet 9. While passing through pressure chamber 4, the extruded shape may be sprayed with water introduced into pressure chamber 4 through pipes 7 and may be at least partially supported by water that has collected in pressure chamber 4. Excess water may be drawn off through outlet 15. The extruded shape may be threaded through rubber outlet 12 and may be continuously carried off on conveyor belt 14.

Other fluids than air may be introduced into the pressure chamber, and the extruded shape may be cooled by a method other than spraying with water. The use of a separate coolant may be avoided if the fluid introduced into the chamber under pressure is itself a sufficiently effective cooling medium.

The method described herein is particularly suitable for the extrusion of those synthetic organic thermoplastic materials which cannot be successfully extruded by conventional methods owing to the tendency towards bubble formation. While this tendency is to some extent characteristic of cellulosic plastics such as, for example, cellulose acetate, cellulose nitrate, cellulose aceto-butyrate and cellulose propionate, it is even greater in the case of the ethenoid resin polymers. The method described herein is therefore particularly well adapted to the extrusion of the ethenoid resin polymers.

Ethenoid resins are recognized as that group of synthetic resins which, in the monomeric form, are characterized by the fact that they have a $CH_2=C$ group as a chief functional group. This group is present in styrene and in the derivatives of acrylic acid, alpha-substituted acrylic acid, and vinyl alcohol. The term "ethenoid resins" has been recognized as applicable to these resins, because they are all theoretically derivatives of ethylene. Specifically, the ethenoid polymers include polystyrene; the polyesters and corresponding polyamides and polynitriles of acrylic and alpha-substituted acrylic acids; and the polyesters and polyhalides of vinyl alcohol. Particular ethenoid resin polymers which may be extruded by our method and apparatus without danger of bubble formation include polymethyl methacrylate and its copolymers with other methacrylic or acrylic acid esters, such as, for example, ethyl methacrylate, methyl acrylate, ethyl acrylate and allyl acrylate; polyvinyl chloride; polyvinyl acetate; polymerized vinyl-idene-chloride; and polystyrene.

It should be understood that mixtures and copolymers of the above materials may be extruded by our method and apparatus without danger of bubble formation and that plasticizers, dyes, fillers, and pigments may be added. For example, a copolymer of ethyl acrylate and vinyl chloride may be extruded by our method and apparatus without danger of bubble formation.

It will be apparent that changes may be made in the method described herein without departing from the invention. For example, instead of continuously removing the extruded shape from the pressure chamber a quantity of the extruded shape may be allowed to collect in the pressure chamber and may be removed therefrom after cooling.

Although heating coils were hereinbefore referred to as attached to the extrusion die, any other suitable heating means may be used. And although the outlet, through which the extruded shape may be continuously withdrawn from the pressure chamber, has been referred to as constructed of rubber, any other suitable material may be used in its construction.

We claim:

1. A method of manufacturing bubble-free shapes of substantial cross-sectional dimensions from extrudable synthetic organic thermoplastic material which comprises extruding the thermoplastic material under heat and pressure through a die of the desired shape into a pressure chamber containing a fluid under superatmospheric pressure, maintaining the superatmospheric pressure on the extruded shape while cooling the extruded shape to below the temperature at which bubbles normally form by spraying with water, and removing said extruded shape from said chamber.

2. A method of manufacturing bubble-free shapes of substantial cross-sectional dimensions from extrudable synthetic organic thermoplastic material which comprises extruding the thermoplastic material under heat and pressure through a die of the desired shape into a pressure chamber containing air under superatmospheric pressure, maintaining the superatmospheric pressure on the extruded shape while cooling the extruded shape to below the temperature at which bubbles normally form by spraying with water, and continuously removing said extruded shape from said pressure chamber.

3. A method of manufacturing bubble-free rods, tubes, bars, and sheets from extrudable synthetic organic thermoplastic material which comprises extruding the thermoplastic material under heat and pressure through a die of the desired shape into a pressure chamber containing a fluid under superatmospheric pressure, maintaining the superatmospheric pressure on the extruded material while cooling the material by spraying with a liquid coolant to below the temperature at which bubbles normally form, and removing said extruded material from said chamber.

4. A method of manufacturing bubble-free rods, tubes, bars and sheets from extrudable synthetic thermoplastic polymeric ethenoid resins which comprises extruding said ethenoid resins under heat and pressure through a die of desired shape into a pressure chamber containing a fluid under superatmospheric pressure, maintaining the superatmospheric pressure on the extruded material while cooling the material by spraying with a liquid coolant to below the temperature at which bubbles normally form, and removing said extruded material from said chamber.

5. A method of manufacturing bubble-free rods, tubes, bars, and sheets from extrudable synthetic organic polymeric ethenoid resins which comprises extruding said ethenoid resins under heat and pressure through a die of desired shape into a pressure chamber containing a fluid under superatmospheric pressure, maintaining the superatmospheric pressure on the extruded resin while cooling the extruded resin by spraying with water to below the temperature at which bubbles normally form, and removing said extruded resin from said chamber.

6. A method of manufacturing bubble-free rods, tubes, bars, and sheets from an extrudable acrylic resin which comprises extruding said acrylic resin under heat and pressure through a die of desired shape into a pressure chamber containing a fluid under superatmospheric pressure, maintaining the superatmospheric pressure on the extruded resin while cooling the extruded resin by spraying with water to below the temperature at which bubbles normally form, and removing said extruded resin from said chamber.

7. A method of manufacturing bubble-free rods, tubes, bars, and sheets from an extrudable polymeric ester of methacrylic acid which comprises extruding said polymeric ester under heat and pressure through a die of desired shape into a pressure chamber containing a fluid under superatmospheric pressure, maintaining the superatmospheric pressure on the extruded polymeric ester while cooling the ester by spraying with water to below the temperature at which bubbles normally form, and removing said extruded polymeric ester from said chamber.

JAMES R. HILTNER.
WILLIAM BERLINGHOF, JR.